United States Patent [19]
Bafford

[11] 3,800,007
[45] Mar. 26, 1974

[54] PROCESS FOR PREPARING BLOCK COPOLYMERS WITH PEROXY CONTAINING CHAIN- TRANSFER AGENTS AND PRODUCTS

[75] Inventor: Richard Anthony Bafford, Aiken, S.C.

[73] Assignee: Pennwalt Corporation, Philadelphia, Pa.

[22] Filed: Oct. 18, 1971

[21] Appl. No.: 190,376

[52] U.S. Cl. ......... 260/877, 260/878 R, 260/878 B, 260/879, 260/881, 260/882, 260/884, 260/885, 260/886, 260/DIG. 28
[51] Int. Cl. ............................................... C08f 1/60
[58] Field of Search ............ 260/877, 878 B, 876 B, 260/879, 93.5 S, 880 B, 881, 28, 897, 895, 885, 886, 884, 882

[56] References Cited
UNITED STATES PATENTS

| 2,984,648 | 5/1961 | Williams et al. | 260/93.5 S |
| 3,189,664 | 5/1965 | Nozaki | 260/878 B |
| 3,429,951 | 2/1969 | Childers | 260/876 B |
| 3,485,894 | 12/1969 | Porter | 260/876 B |
| 3,706,818 | 12/1972 | Magelli et al. | 260/885 |

FOREIGN PATENTS OR APPLICATIONS

| 857,145 | 12/1960 | Great Britain | 260/885 |

*Primary Examiner*—Murray Tillman
*Assistant Examiner*—J. Ziegler
*Attorney, Agent, or Firm*—William D. Mitchell, Esq.

[57] ABSTRACT

Block copolymers are prepared by polymerizing an unsaturated monomer in the presence of a polymerization catalyst and a chain transfer agent which is a cumyl peroxide containing one or more alkyl or cycloalkyl substituents, which substituents have at least one benzylic hydrogen atom, at a temperature below that which the peroxide decomposes, and subsequently polymerizing the peroxy containing polymer so formed in the presence of additional monomer at a temperature above the decomposition point of the peroxide.

14 Claims, No Drawings

PROCESS FOR PREPARING BLOCK COPOLYMERS WITH PEROXY CONTAINING CHAIN-TRANSFER AGENTS AND PRODUCTS

BACKGROUND OF THE INVENTION AND THE Prior Art

The preparation of a variety of block and graft copolymers is well-known in the art. In particular, the mode of preparation of macro-molecular (polymeric) free radical initiators is recognized.

Two general methods for the synthesis of macromolecular free radical initiators are (a) copolymerization of oxygen or a copolymerizable peroxide, e.g., di-t-butyl diperoxyfumarate with another vinyl monomer to give a random distribution of peroxy linkages along the polymer chain and (b) autoxidation of a polymer to produce pendant hydroperoxy groups along the polymer backbone.

The main difficulty of the first method is controlling the distribution of peroxy linkages in the polymer. Method (b) has the same disadvantages as well as other disadvantages, namely, autoxidation of polymers generally leads to polymer degradation and the difficulty of preparing sufficiently concentrated polymer solutions to carry out autoxidation on a practical scale.

Radical attack on macromolecules can also be used to prepare block and graft copolymers. Two general methods for this process are (a) the synthesis of polymers with reactive sites characterized by high chain transfer constants and (b) polymerization of vinyl monomers in the presence of polymers containing double bonds. Preparation of block or graft copolymers by method (a) leads to mixtures of the two homopolymers and the block copolymers, while radical attack of unsaturated polymers, method (b), leads to some polymer degradation.

Summary of the Invention

The present invention involves a simple process for the preparation of block copolymers which avoids or reduces many of the problems associated with the above-mentioned prior art.

Essentially, the process of this invention consists of carrying out the polymerization of an unsaturated monomer in the presence of a peroxide having a high chain transfer constant at a temperature at which the peroxide is stable, isolating the polymer having peroxidic groups by conventional polymer purification techniques and carrying out the polymerization of a second unsaturated monomer in the presence of the peroxy-containing polymer at a temperature at which said peroxy groups dissociate into free radicals.

The class of peroxides having high chain transfer constants which render them operative in the process of this invention can be defined by the formula:

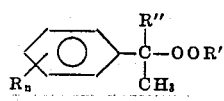

in which R is an alkyl group having 1 to 8 carbon atoms or a cycloalkyl group of 5 to 8 carbon atoms, said alkyl or cycloalkyl group containing 1 to 3 benzylic hydrogen atoms; or where R" is alkylene R can also be hydrogen; R' is

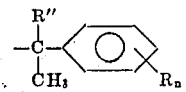

or a tertiary alkyl group of 4 to 8 carbon atoms; and $n$ is an integer of 1 to 5.

R" is methyl or a divalent alkylene radical having 2 or 3 carbon atoms which is attached at one end to the benzene ring ortho to the peroxy-substituted moiety and at the other end to the peroxy-substituted carbon atom.

Preferably, R is lower alkyl of 1 to 4 carbon atoms such as methyl, ethyl, n-propyl, isopropyl, n-butyl or sec.-butyl. Most preferably, R is methyl, isopropyl or sec.-butyl, with isopropyl groups being the most favored. Isopropyl groups or other groups having a hydrogen atom attached to a tertiary benzylic carbon atom are favored because such hydrogens are expected to have especially high chain transfer constants. Isopropyl benzene, for instance, has a transfer constant of $8.2 \times 10^{-5}$ in styrene at 60° C. and $20.0 \times 10^{-5}$ at 100° C. (R. Gregg and F. Mayo, *Discussions Faraday Soc.*, 2,328 (1947).)

Where R' is tertiary alkyl, tert.-butyl is most preferred.

R" is preferably methyl or the divalent ethylene radical.

While $n$ can by an integer up to 5 it is preferred that $n$ is 1 or 2.

Specific peroxides which are embraced by the above-formula are listed in Table I below.

TABLE I

PEROXIDES HAVING HIGH CHAIN TRANSFER REACTIVITY p-isopropylcumyl t-butyl peroxide
bis(p-isopropylcumyl) peroxide
3,5-diisopropylcumyl t-butyl peroxide
bis(3,5-diisopropylcumyl) peroxide
m-isopropylcumyl t-amyl peroxide
bis-(m-isopropylcumyl) peroxide
bis(pentamethylcumyl) peroxide
3,5-dimethylcumyl t-butyl peroxide
bis(2,4-diethylcumyl) peroxide
bis(4-cyclohexylcumyl)peroxide
p-isopropylcumyl cumyl peroxide
p-methylcumyl cumyl peroxide
2,4,6-trimethylcumyl t-butyl peroxide
1-t-butylperoxy-1-methylindane The first polymerization of the α, β-ethylenically unsaturated monomer in the presence of the chain transfer peroxide can be carried out in bulk, solution, emulsion, or suspension, using a catalyst capable of effectively polymerizing the particular monomer used at a temperature at which the chain transfer peroxide does not decompose. Thus, for the peroxides listed in Table I, the maximum effective polymerization temperature is about 80° C. Temperatures as low as −10° C may used, especially if initiation is via a redox system. A preferred range is −10° C. to 70° C.

The catalyst for the initial polymerization can be any of the conventional catalysts used for addition polymerization. Any of the known catalysts of the free-radical, ionic or redox type can be used.

The second polymerization, that is, the polymerization of a second α, β-ethylenically unsaturated monomer in the presence of the peroxy-containing polymer prepared in the first step, is conducted at an operating temperature of above 80° C, preferably from 80° to 150° C, and most preferably from about 100° C to 125° C. The recited temperatures are particularly for the peroxides listed in Table I. It should be apparent that variations from the listed structures may require additional variations with respect to the polymerization temperature conditions. The operating temperatures are also dependent upon the particular monomers, the degree of polymerization desired, and other factors, but the essential criteria are that the first polymerization is conducted at a temperature low enough so that the chain transfer peroxide is not substantially destroyed and the second polymerization introducing the block chain is conducted at a temperature high enough so that the peroxy groups in the initial polymer can be decomposed.

The monomers which are suitable for use in this invention can vary widely and can be selected from the vast array of combinations of polymerizable unsaturated monomers utilized in block copolymers in the prior art.

The monomers which are particularly contemplated in this invention are of several classes as follows.
1. The alkenes, such as ethylene, propylene and butylene;
2. the unsaturated acids, such as acrylic acid, methacylic acid, maleic acid, and fumaric acid;
3. the esters of the above-mentioned unsaturated acids, such as methyl and ethyl acrylate, methyl methacrylate, and the like;
4. the various vinyl esters, ethers, halides and nitriles, such as, vinylacetate, vinylbutyrate, vinylether, vinylcyanide (acrylonitrile), vinylchloride, and vinylidene chloride;
5. the vinyl aromatic monomers, such as vinylbenzene (styrene), divinylbenzene, α-methylstyrene, α-chlorostyrene, vinyl toluene and the like; and
6. the vinyl hetero aromatic monomers, such as vinyl pyridine and vinyl pyrrolodine; and
7. the conjugated dienes such as butadiene, isoprene and chloroprene.

The proportion of chain transfer peroxides with respect to the monomer in the initial polymerization step can vary widely. Generally, the peroxide comprises 0.1 to 25.0 mole percent based on the monomer. It is preferred that the amount of chain transfer agent be 1.0 to 10.0 mole percent.

The block copolymers of this invention are useful for such applications as compatibilizing agents, impact modifiers, adhesives and for modifying and improving polymer properties. Many homopolymers are incompatible with other homopolymers but when a block copolymer of the two incompatible homopolymers is added, compatibilization occurs. The impact resistance of brittle polymers can be significantly improved by incorporating the approximate block copolymers therein. Block copolymers are excellent adhesives especially for laminating two sheets of the two homopolymers making up the block segments of the block copolymers.

PERPARATION OF THE PEROXIDES

The peroxides which are an essential part of the practice of this invention can be prepared by the (a) known acid-catalyzed alkylations of tertiary alcohols with hydroperoxides or by the (b) addition of hydroperoxides to substituted α-methylstyrenes in the presence of the respectively substituted cumyl halide.

The methods shown in the following illustrations are easily adapted to prepare the various peroxides embraced by this invention.

ILLUSTRATION 1

This illustration shows the preparation of 2,4,6-trimethylcumyl t-butyl peroxide by the method (a) comprising the acid-catalyzed alkylation of a tertiary alcohol with a hydroperoxide.

A jacketed reactor was equipped with a paddle stirrer, thermometer and addition funnel. Into the reactor was charged 11.65 g. (0.084 m.) of 70 percent sulfuric acid. The acid was cooled to −7° C. by circulating ice brine through the reactor jacket. Then 11.3 g. (0.126 m.) of 100 percent t-butyl hydroperoxide was cautiously added to the sulfuric acid while not allowing the temperature to rise above −6° C. To the well stirred mixture was added 15 g. (0.085 m.) of 2,4,6,α, α-pentamethylbenzyl alcohol over a 45 minute period.

The mixture was then stirred at −10 to 0° C. for 4 hours. Ether (100 ml.) was added, the phases allowed to separate and the aqueous layer drawn off and discarded. The organic layer was washed with two 50 ml. portions of 10 percent aqueous potassium hydroxide solution followed by four 50 ml. portions of water. The ethereal layer was separated, dried ($MgSO_4$) filtered and stripped in vacuo. The product (14 g., 66 percent yield) was a pale yellow oil and assayed 75 percent, based on active oxygen content.

ILLUSTRATION 2

This illustration shows the preparation of bis(p-isopropylcumyl) peroxide by the method (b) involving the addition of a hydroperoxide to a substituted α-methyl styrene.

A two-liter flask was equipped with a turbine-type mechanical stirrer, thermometer, efficient reflux condenser and a gas-dispersion tube for passing oxygen through the reaction mixture. Flowmeters were used to measure rate of oxygen input and rate of gas evolution.

Into the flask was placed 162 g. (1.0 mole) of p-diisopropylbenzene (Texaco), 490 g. of deionized water, 10 g. of saturated sodium carbonate solution, 0.5 g. of sodium stearate and 1.0 g. of azobisisobutyronitrile. Vigorous stirring was initiated and oxygen gas bubble in at the rate of 2 cc./minute. The reaction mixture was slowly heated to about 80° C. When the temperature reached 80°, rapid absorption of oxygen was noted and the oxygen input rate was raised to 140 cc./minute. Rapid gas absorption continued for about 30 minutes and the rate of absorption diminished very gradually. After continuing the autoxidation for 2 ½ hours, a 1.00 ml. sample of the reaction mixture was added to a mixture of 20 ml. of deoxygenated acetic acid and 5 g. of solid sodium iodide in an iodine flask. The flask was stoppered, placed in the dark for 30 minutes and the liberated iodine titrated with 0.100N sodium thiosulfate solution. The sample required 8.00 ml. of thiosulfate solution.

The oxidation was continued at 80° and a sample withdrawn after 3 ⅔ hours required 19.45 ml. of thiosulfate solution. After 5 ¼ hours, a sample required 18.60 ml. of thiosulfate. Since this indicated that the rate of hydroperoxide decomposition was about the same as the rate of hydroperoxide formation, the oxidation was terminated.

Stirring was stopped, 300 ml. of saturated sodium chloride solution was added to the warm reaction mixture and the phases allowed to separate. The aqueous phase was taken off and cooled. The organic phase was taken up in 200 ml. of ether, dried (MgSO$_4$), filtered and stripped in vacuo. A crystalline phase separated during the stripping. The crystals were filtered off and washed on the filter with cold hexane. The crystals weighed 29.3 g. and were identified by melting point and active oxygen content as diisopropylbenzene dihydroperoxide. An additional 6 g. of this compound precipitated from the aqueous phase.

The organic filtrate was stripped in vacuo to remove the hexane and cooled to 0° C. but no further crystals separated. The organic phase was then stripped under high vacuum (0.01 mm.) at 35°–40° C. to strip out as much of the unreacted diisopropylbenzene as possible. The residue weighed 70 g. and contained, by iodometric assay, 80.5 percent of p-isopropylcumyl hydroperoxide.

A jacketed reactor was equipped with a paddle stirrer and thermometer. Into the reactor was charged 13.8 g. (0.086 m.) of p-isopropenylcumene (Texaco), 2.75 g. (0.014 m.) of p-isopropylcumyl chloride and 36 g. (0.15 m.) of 80.5 percent p-isopropylcumyl hydroperoxide. The mixture was sirred at 30° C. for 5 hours and then washed at 20°–25° C. with 50 ml. of 20% sodium chloride solution, two 20 ml. portions of 20 percent sodium hydroxide solution and finally with a 20 ml. solution consisting of 10 ml. of 20 percent sodium hydroxide and 10 ml. of saturated sodium chloride solution. The product began to crystallize in the reactor and was taken up in 80 ml. of ether. The ethereal solution was washed with 150 ml. of water, dried (Na$_2$SO$_4$), filtered and stripped in vacuo. The residual solid was slurried with cold methanol and filtered. The crude solid (17.0 g.) was recrystallized from hot methanol giving 13.6 g. of colorless crystals melting at 69°–71°. The assay by active oxygen content was 99 percent, and the yield 38.3 percent.

The half-life of the product, bis(p-isopropylcumyl) peroxide, in benzene is 7.2 hours at 115° C.

ILLUSTRATION 3

This illustration shows the preparation of p-isopropylcumyl t-butyl peroxide by the method (b).

A mixture of 10.8 g. (0.12 m) of 100 percent t-butyl hydroperoxide, 2.7 g. (0.014 m.) of p-isopropylcumyl chloride and 13.8 g. (0.086 m.) of p-isopropenylcumene was stirred 3 hours at 28°–30°. After the work-up described in Illustration 2, 22.5 g. (90 percent yield) of p-isopropylcumyl t-butyl peroxide ($n_D^{25}$ = 1.4745) was obtained. This peroxide has a half-life of 11.6 hours at 115° C. in benzene.

ILLUSTRATIONS 4–6

These illustrations show the preparation of other peroxides having high chain transfer constants by the method (b).

The peroxides listed in TABLE II were prepared in a manner analagous to that described in Example 2.

TABLE II

| Ex. | Peroxide | $n_D^{25}$(or m.p.) | Assay | $t_{1/2}$(115°C.) |
|---|---|---|---|---|
| 4 | p-methylcumyl cumyl peroxide | 1.5300 | 96.5% | 7.4 hrs. |
| 5 | p-isopropylcumyl cumyl peroxide | 1.5251 | 98.5% | 6.7 |
| 6 | p-methylcumyl t-butyl peroxide | 1.4790 | — | 16.5 |

THE EXAMPLES

EXAMPLE 1

This example illustrates the preparation of a polystyrene-poly(methyl methacrylate) block copolymer utilizing p-isopropylcumyl t-butyl peroxide.

The following reaction sequence is conducted by the method described below.

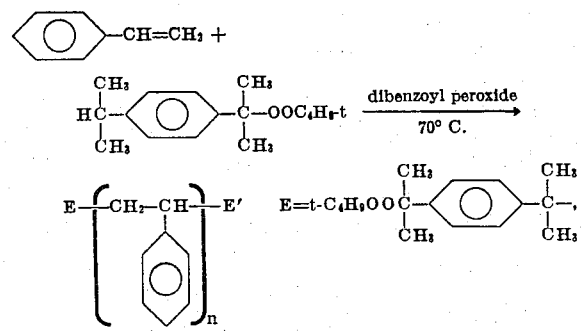

and

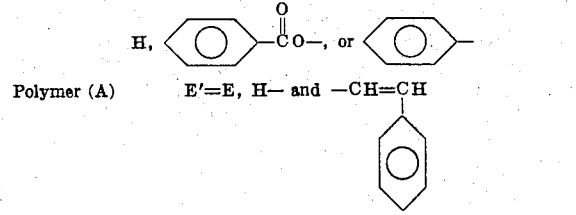

Polymer (A)     E′=E, H— and —CH=CH—

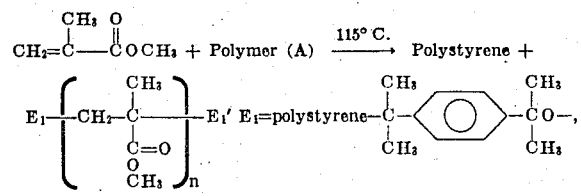

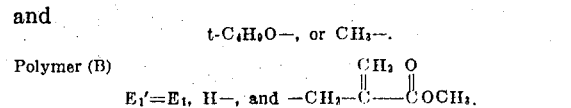

and

Polymer (B)     t-C$_4$H$_9$O—, or CH$_3$—.

It can be seen from the above equations that the process of this invention produces homopolymers as well as block copolymers. Not all of the polystyrene in the first step contains a peroxide end group. Moreover, it cannot be expected that all of the growing polystyrene chains will chain transfer with the peroxide. Also, in the second step, homopolymer (i.e., poly(methyl methacrylate) will be formed from the t-$C_4H_9O$·radicals formed from the decomposition of the peroxy-polymer (A). Since some t-$C_4H_9O$·radicals will undergo $\beta$-scission to acetone and $CH_3$· radicals, one of the definitions for $E_1$ and $E_1'$ is $CH_3$- as well as t-$C_4H_9O$-. Growing poly(methyl methacrylate) and polystyrene chains can couple and this is why E can be equal to E' and $E_1 = E_1'$. Both growing polymer chains can also undergo disproportionation and this is why E' and $E_1'$ can be H or the olefin shown. The E' = H results from the chain transfer reaction as does E = H.

PREPARATION OF PEROXYTERMINATED POLYSTYRENE (A)

A suspension polymerization was conducted using 5 parts of p-isopropylcumyl t-butyl peroxide, as described in Illustration 3, and 100 parts styrene monomer. The polymerization was carried out at 70° for 18 hours using 1.25 parts of benzoyl peroxide as the initiator. The polymer (A) was isolated and purified by dissolving the polymer in benzene and reprecipitating it by adding a large excess (10 parts methanol to 1 part polymer solution) of methanol. This reprecipitation was carried out three times.

PREPARATION OF BLOCK COPOLYMER (B)

A solution of one part of A and two parts of methyl methacrylate was heated under nitrogen for 2.5 hours at 115°C. The resulting copolymer (B) composition stabilized a chloroform solution of the homopolymers for 168 hours while a chloroform solution containing only the two homopolymers separated into two phases in 50–60 minutes.

EXAMPLE 2

This example illustrates the preparation of the same type of block copolymer as in the previous example utilizing a different chain transfer peroxide, bis (p-isopropylcumyl) peroxide.

The block copolymer was prepared in a manner analagous to that described in Example 1 except that bis (p-isopropylcumyl) peroxide was used in place of p-isopropylcumyl t-butyl peroxide. The peroxy-containing polystyrene (A') had an active oxygen content of 0.043 percent. The block copolymer (B') composition stabilized a chloroform solution of the homopolymers for 2 ½ hours while the control was 50–60 minutes.

What is claimed is:

1. In a process for preparing block copolymers which comprises the steps of
   a. preparing a polymer by the addition polymerization of a first polymerizable unsaturated monomer selected from the group consisting of alkenes; unsaturated acids; esters of unsaturated acids, vinyl esters, ethers, halides and nitriles; vinyl aromatics; vinyl hetero aromatics; and conjugated dienes, in the presence of an addition polymerization initiator; and
   b. subsequently polymerizing the polymer of step (a) with a second polymerizable unsaturated monomer which is selected from the same group as defined in (a) but is different from the first monomer,
   the improvement which comprises carrying out the polymerization of step (a) in the presence of 0.1 – 25.0 mole percent, based on the monomer of step (a), of a chain transfer peroxide of the formula

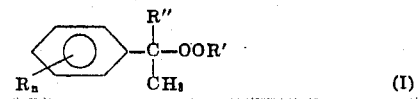

in which: R" is methyl or a divalent alkylene radical of 2–3 carbons which is attached to the phenyl nucleus ortho to the peroxy-substituted moiety;

R is selected from hydrogen, alkyl of 1–8 carbons containing 1–3 benzylic hydrogens or cycloalkyl of 5–8 carbons containing 1–3 benzylic hydrogens, with the proviso that R can only be hydrogen when R" is divalent alkylene;

R' is

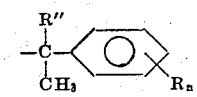

or t-alkyl of 4–8 carbons; and $n$ is an integer of 1–5, at a temperature below the decomposition temperature of peroxide (I), and carrying out the polymerization of step (b) at a temperature sufficient to decompose peroxide (I).

2. The process of claim 1 in which the initial polymerization step ($a$) is conducted at a temperature of −10° to 70° C. and the second polymerization ($b$) is conducted at a temperature of 80° to 150° C.

3. The process of claim 1 in which the chain transfer peroxide is p-isopropylcumyl t-butyl peroxide.

4. The process of claim 1 in which the chain transfer peroxide is bis(p-isopropylcumyl) peroxide.

5. The process of claim 1 in which the chain transfer peroxide is 2,4,6-trimethylcumyl t-butyl peroxide.

6. The process of claim 1 in which the chain transfer peroxide is p-methylcumyl cumyl peroxide.

7. The process of claim 1 in which the chain transfer peroxide is p-methylcumyl t-butyl peroxide.

8. The process of claim 1 in which the chain transfer peroxide is 1-t-butylperoxy-1-methyl indane.

9. The process of claim 1 in which R is methyl, isopropyl or sec-butyl; R' is

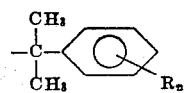

or tert-butyl; and $n$ is 1 or 2.

10. The process of claim 9 in which R is isopropyl.

11. The process of claim 1 in which the initial polymerization step ($a$) is conducted at a temperature of up to 80° C. and the second polymerization step is conducted at a temperature above 80° C.

12. The process of claim 11 in which the monomer of step (a) is styrene and the monomer of step (b) is methyl methacrylate.

13. The process of claim 1 in which the addition polymerization initiator is a free-radical catalyst.

14. The process of claim 13 in which the addition initiator is dibenzoyl peroxide.

* * * * *